April 2, 1957  T. A. ANDERSON  2,787,680
DEACTIVATOR FOR PLUNGER TYPE SWITCHES
Filed March 29, 1954  2 Sheets-Sheet 1

INVENTOR:
THOMAS A. ANDERSON.
BY Eaton + Bell
ATTORNEYS.

April 2, 1957     T. A. ANDERSON     2,787,680
DEACTIVATOR FOR PLUNGER TYPE SWITCHES
Filed March 29, 1954     2 Sheets-Sheet 2
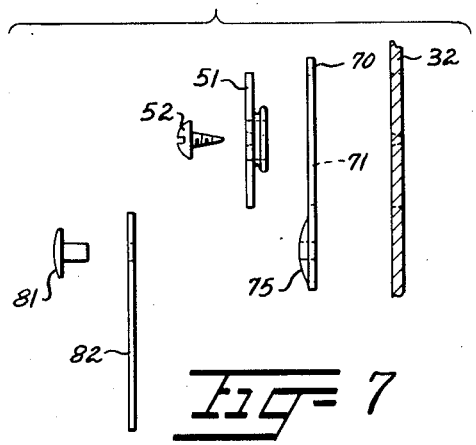
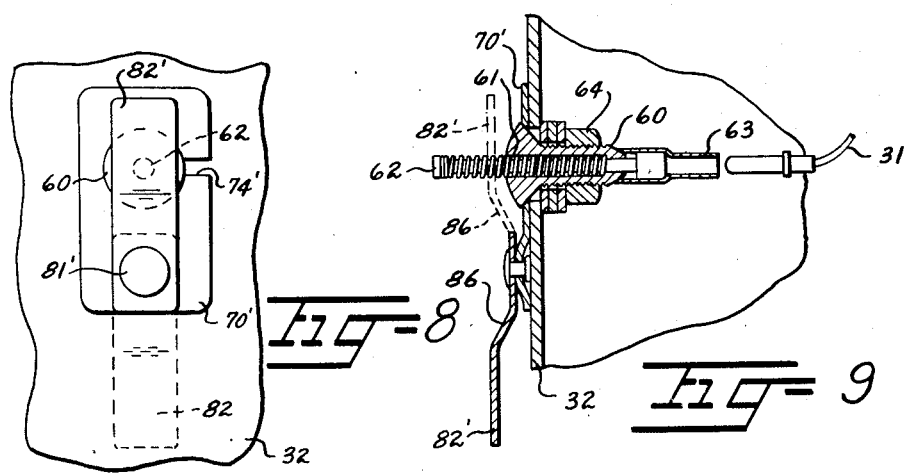
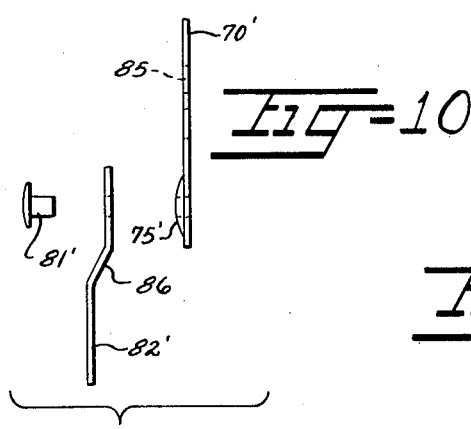
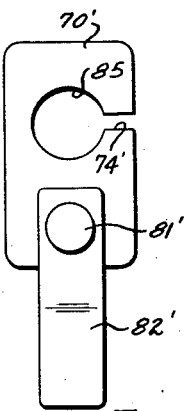
INVENTOR:
*Thomas A. Anderson.*
BY *Eaton & Bell*
ATTORNEYS.

United States Patent Office 2,787,680
Patented Apr. 2, 1957

2,787,680

DEACTIVATOR FOR PLUNGER TYPE SWITCHES

Thomas A. Anderson, Hartwell, Ga., assignor, by direct and mesne assignments, to Deactivator, Inc., Anderson, S. C., a corporation of South Carolina Application March 29, 1954, Serial No. 419,223

2 Claims. (Cl. 200—61.79)

This invention relates to a device associated with plunger type switches for selectively opening and closing an electrical circuit.

It is an object of this invention to provide a deactivator for plunger type switches which is capable of universal installation in association with all forms of plunger type switches and wherein means are provided for installing the deactivator without additional fastening means and without disconnecting any wires.

It is another object of this invention to provide a deactivator for plunger type switches which is operable when it is desired to break a closed circuit in the absence of pressure from the normal circuit breaking means, such as an automobile door.

For purposes of illustration, the invention is described herein in association with a plunger type switch positioned in the door frame of an automobile and interposed in an electrical circuit to the interior lights of an automobile whereby the circuit to the interior lights will be broken to turn off the lights when the car door is closed and said circuit will be closed to turn on the interior lights when the automobile door is opened.

Some of the objects of the invention having been stated, other objects will appear as the description proceeds, when taken in connection with the accompanying drawings in which—

Figure 7 is an exploded somewhat schematic view of the deactivator and switch shown in Figures 5 and 6;

Figure 8 is a front elevation of a modified form of the present invention associated with a third form of plunger type switch;

Figure 9 is a vertical sectional view of the modified form of deactivator and switch shown in Figure 8;

Figure 10 is a view similar to Figure 4, but showing the modified form of the invention;

Figure 11 is a front elevation of the modified form of the invention removed from the switch.

Referring more specifically to the drawings, three forms of plunger type switches are shown with any one of which the improved switch deactivator may be readily associated. It is to be understood, however, that the switch deactivator may also be used in association with other forms of plunger type switches without departing from the spirit of the invention.

Figure 1:
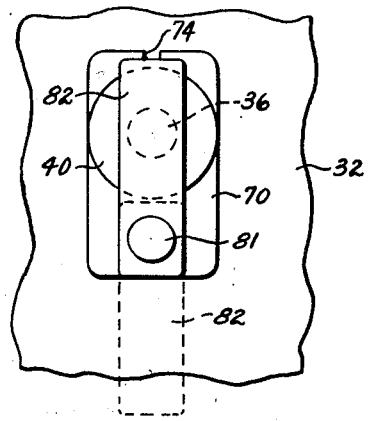
Figure 1 is a front elevation of the present invention associated with one form of plunger type switch.
Figure 2:
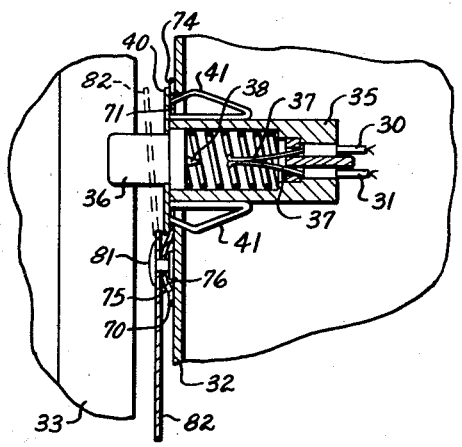
Figure 2 is a vertical sectional view through the switch deactivator and switch shown in Figure 1.

Each of the switches illustrated is connected by wires 30 and/or 31 to an electrical circuit between a suitable source of electrical energy, such as an automotive battery, not shown, and a light, not shown, such as the interior lights of an automobile. Each of the switches illustrated is mounted in a frame 32 of an automobile door 33. The switch shown in Figures 1 and 2 is of a type manufactured by Ford Motor Company under their part number OA-13713 as listed on page 369 of Form 3752 in the Ford Motor Company Parts Catalog for 1949 Through 1954 Passenger Cars, and comprises a tubular casing 35 having a spring pressed plunger 36 extending from and slidably mounted in the end thereof remote from the wires 30 and 31.

The wires 30 and 31 are secured to a pair of spring pressed or leaf spring contact points 37 normally biassed into touching engagement and separable by an insulated member 38 extending inwardly from the inner end of the plunger 36 to break the circuit to the lights. The casing 35 has a retaining plate 40 fixed to the end thereof adjacent the plunger 36 and to the inner surface of which a pair of spring pressed detents 41 are secured. The detents 41 are in the form of flat spring members which serve to clamp the switch in an opening in the frame 32.

Figure 5:
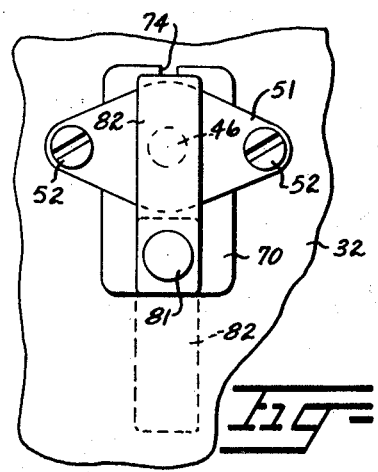
Figure 5 is a front elevation of the switch deactivator shown in Figures 3 and 4, but in association with a second form of switch.
Figure 6:
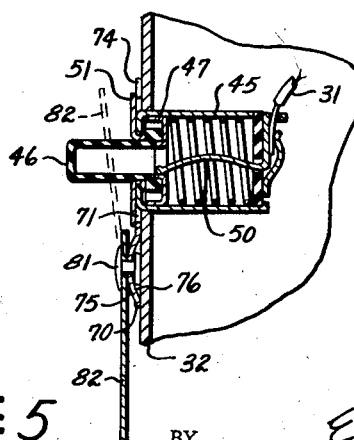
Figure 6 is a vertical sectional view through the switch deactivator and switch shown in Figure 5.

The second form of switch illustrated in Figures 5, 6 and 7 is of a type manufactured by General Motors Corporation under their Part Number 459857 in Group 11950 of their 1954 Pontiac Catalog. This switch comprises a casing 45 having a non-metallic spring pressed hollow plunger 46 slidably mounted in the end thereof remote from the wire 31. The inner end of the plunger 46 is mounted in a metallic base 47 which normally engages one end of a contact bar 50 connected to the wire 31 to ground the circuit. The circuit is opened upon the hollow plunger 46 being forced inwardly within the casing 45 to a point where the contact bar is no longer grounded on the metallic base 47. A transverse retaining plate 51 is fixed to the end of the casing 45 adjacent the plunger 46. The plate 51 is penetrated by screws 52 threadably embedded in the frame 32 for securing the switch thereto.

The switch illustrated in Figures 8 and 9 is of a type manufactured by Chrysler Corporation under their Part Number 1439748 as listed in their 1953 Mo-Par Catalog and comprises a threaded bolt or externally threaded casing 60 having an axial bore 61 therethrough. A spring pressed plunger 62 is loosely mounted in the bore 61 and a hollow terminal 63 connected to the wire 31 is insulatably mounted on the inner end of the plunger 62. The third form of switch is mounted in an opening in the frame 32 and held in place by washers and a nut 64 threadably mounted on the bolt 60.

The form of switch deactivator shown in association with the first and second forms of switches (Figures 1 to 7, inclusive) comprises a plate or base member 70 preferably formed from a flat sheet of rigid material, such as sheet metal.

The plate 70 is preferably substantially rectangular in elevation and has an opening 71 therein which is preferably of the same shape as and slightly larger than the exterior of the casing 35 or 45, as the case may be. The opening 71 is shown as being substantially circular in Figure 4. Rectangular cut-outs or notches 72 and 73 communicate with opposite segments of the opening 71 and the plate 70 also has a slot or passageway 74 extending from one edge thereof and communicating with the rectangular notch 72. The passageway or slot 74 is an important feature of the present invention in that it facilitates mounting the switch deactivator on the switch casing 35, 45 or 60, as the case may be, without disconnecting the wires 30 and 31, or wire 31, from the corresponding switch casings. The switch is merely withdrawn from the door frame, the wire or wires passed through slot 74 and the casing inserted in opening 71, and the switch can then be reinstalled as shown in Figure 2 or 6.

One surface of the plate 70, hereinafter referred to as the front surface, is provided with a raised portion or projection 75 spaced from the notch 73, said raised portion 75 preferably being formed by punching or dimpling the opposite or rear surface of the plate 70 to form a depression 76 in said rear surface simultaneously with the forming of the projection 75.

One end of an arm or deactivating plate 82 is pivotally mounted on the projection 75 of the plate 70, as by a pin or rivet 81 which loosely penetrates the arm 82 and the projection 75. The inner end of the pin or rivet 81, remote from the arm 82, may be peened, flattened or otherwise secured within the depression 76 to provide a smooth rear surface on the plate 70.

The switch deactivator of the present invention may be used with any plunger type switch, such as those illustrated herein, by simply removing the switch from its supporting surface, such as the frame 32, and moving the switch outwardly from the frame to a point where a portion of the wire 31, or wires 30 and 31, is positioned forwardly or outwardly of the frame 32. The wires 30 and/or 31 are then passed through the slot 74 in the plate 70 of the deactivator and the casing of the switch passed through the opening 71 in the plate 70 to a point where the retaining member on the switch is adjacent the plate 70. The rectangular cut-outs or notches 72 and 73 are provided to accommodate detents, such as those shown at 41 in Figure 2, in the event the deactivator is associated with that form of switch.

Figure 3:
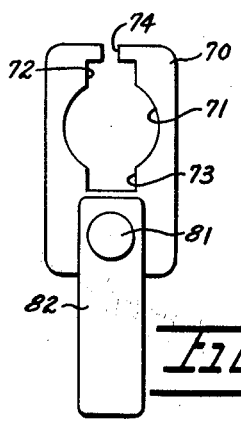
Figure 3 is a front elevation of the improved switch deactivator removed from the switch.
Figure 4:
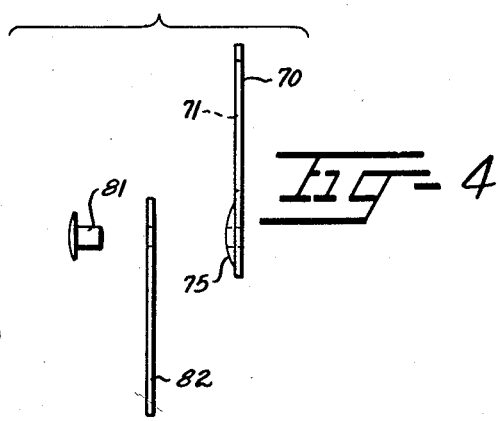
Figure 4 is an exploded somewhat schematic view of the switch deactivator.

The form of deactivator shown in Figures 3 and 4 may also be used in association with the switch shown in Figures 8 and 9 by merely positioning a conventional washer, not shown, between the head of the bolt 60 and the plate 70 of the deactivator to prevent the head of the bolt 60 from passing through the opening 71 in said plate 70. However, a modified form of the present invention, as shown in Figures 8, 9, 10 and 11, may be used in association with a plunger type switch such as shown in Figures 8 and 9, thereby eliminating the necessity of employing a washer. The modified form of the invention is substantially the same as that heretofore described and like parts shall bear like reference characters with the prime notation added.

The plate 70' is provided with a substantially circular opening 85 and a pivotally mounted arm 82' is provided with an angled portion 86 to facilitate passing the arm 82' over the outer end of the plunger 62. Notches such as 72 and 73 (Figure 3) may be omitted, if desired, or, if the modified form of deactivator is to be used with a switch having detents thereon, then suitable rectangular cut-outs or notches may be provided in a manner similar to that shown in the first form of the invention.

The operation of both forms of the invention is identical and comprises simply depressing the plunger of the switch with one finger and positioning the arm 82 or 82' over the depressed plunger to prevent outward movement thereof until such time as it is desired to again complete the circuit to turn on the lights, at which time the arm 82 or 82' may be removed from engagement with the plunger to allow the same to move outwardly.

It is thus seen that there is provided an improved switch deactivator adapted for use with plunger type switches which may be readily installed with any existing type of such switch without the use of screws or other fastening means, without the necessity of detaching any wires that may be attached to the switch and which is extremely simple in construction and operation to effectively break a circuit when desired.

In the drawings and specification there has been set forth a preferred embodiment of the invention and, although specific terms are employed, they are used in a generic and descriptive sense only and not for purposes of limitation, the scope of the invention being defined in the claims.

I claim:

1. In an automobile door switch having a casing inserted through an automobile door frame and having means of greater dimensions than said casing on the outer end of the casing for engaging the outer surface of said door frame, at least one wire connected to the inner end of said switch and extending to a point remote from said switch, a plunger normally held outward from said switch by spring tension and being arranged to open an electrical circuit when forced inwardly by closing the door within said frame and to close said circuit when extended outwardly; the combination therewith of a switch deactivator comprising a base plate provided with an opening therein of greater dimensions than the casing and of lesser dimensions than said means on the outer end of the casing, said plate having a passageway extending from its outer edge to said opening, and a deactivating plate pivotally mounted on said base plate in spaced relation to said opening whereby said casing may be withdrawn from said frame, the wire inserted through said passageway into said opening, the casing inserted through said opening and the casing re-inserted in said door frame and the deactivating plate may be swung into engagement with said plunger to hold it in depressed position and maintain said switch open.

2. In a plunger type switch having a casing inserted through a supporting member and having means of greater dimensions than said casing on the outer surface of said supporting member; the combination therewith of a switch deactivator comprising a base plate provided with an opening therein communicating with one edge of the base plate, said opening being of greater dimensions than the casing and of lesser dimensions than said means on the outer end of the casing, and a deactivating plate pivotally mounted on said base plate in spaced relation to said opening.

References Cited in the file of this patent

UNITED STATES PATENTS

| | | |
|---|---|---|
| 1,077,877 | Fitch | Nov. 4, 1913 |
| 1,168,066 | Girardot | Jan. 11, 1916 |
| 2,150,873 | Schultz | Mar. 14, 1939 |
| 2,656,427 | Fiorucci | Oct. 20, 1950 |